United States Patent

[11] 3,566,232

[72] Inventor Orrin H. Grangaard, Jr.
St. Paul, Ramsey, Minn.

[21] Appl. No. 775,332
[22] Filed Nov. 13, 1968
[45] Patented Feb. 23, 1971
[73] Assignee Honeywell Inc.
Minneapolis, Minn.

[54] BRIDGE CIRCUITS
2 Claims, 3 Drawing Figs.

[52] U.S. Cl. .......... 323/75, 324/62
[51] Int. Cl. .......... G01r 17/10
[50] Field of Search .......... 323/74, 75 (B), (N); 324/62

[56] References Cited

UNITED STATES PATENTS

| | | | |
|---|---|---|---|
| 3,378,024 | 4/1968 | Kruik | 323/75X(N) |
| 3,439,258 | 4/1969 | Van Leeuwen | 323/75(N) |
| 3,467,501 | 9/1969 | Groszek | 323/75X(N) |

*Primary Examiner*—J. D. Miller
*Assistant Examiner*—A. D. Pellinen
*Attorneys*—Charles J. Ungemach, Ronald T. Reiling and James A. Phillips

ABSTRACT: A balanceable circuit made up of two parallel branches each containing two impedance elements. Two of the impedance elements, one in each branch, are variable so that the circuit can be balanced. A portion of at least one of the variable impedance elements is in series with the balanceable circuit and compensates for changes in the output impedance of the balanceable circuit.

PRIOR ART

INVENTOR.
ORRIN H. GRANGAARD JR.
BY Charles J. Ungemach
ATTORNEY

INVENTOR.
ORRIN H. GRANGAARD JR.

BY Charles J. Ungemach

ATTORNEY

BRIDGE CIRCUITS

BACKGROUND OF THE INVENTION

The invention is in the field of impedance bridges and in particular is an impedance bridge which has a sensitivity which does not change appreciably as a function of the impedances making up the bridge.

DESCRIPTION OF THE PREFERRED EMBODIMENTS

The FIG. labeled "Prior Art" is a typical bridge circuit. This circuit contains four impedance elements, $Z_1$, $Z_2$, $Z_3$, and $Z_4$. Impedances $Z_1$ and $Z_3$ are connected in series between a source of positive potential $+V$ and summing point 10. Impedances $Z_2$ and $Z_4$ are connected in series between a source of negative potential $-V$ and summing point 10. Impedance $Z_3$ and $Z_4$ are a variable. Summing point 10 is connected to the input of a high gain amplifier 12. An impedance $Z_5$ is connected between the output terminal of amplifier 12 and its input terminal. When the bridge is balanced or nulled the following equations hold: $Z_1+Z_3=Z_2+Z_4$ (1)

$$Z_0=\frac{(Z_1+Z_3)(Z_2+Z_4)}{Z_1+Z_2+Z_3+Z_4}=\frac{Z_1+Z_3}{2}=\frac{Z_2+Z_4}{2} \qquad (2)$$

where $Z_0$ is the output impedance of the bridge circuit. Impedance $Z_0$ is the impedance seen looking into summing point 10. Amplifier 12, impedance $Z_5$, *and output impedance* $Z_0$ form an operational amplifier. The gain of the operational amplifier, A, to incrementally small bridge unbalances is:

$$A=\frac{Z_5}{Z_0} \qquad (3)$$

and it is clear that the gain or sensitivity of the bridge circuit is a function of the impedances $Z_3$ and $Z_4$ since $Z_0$ is a function of these two impedances. The techniques and circuits to be described modify the variation in gain A due to changes in the impedances $Z_3$ and $Z_4$.

Figure 1:
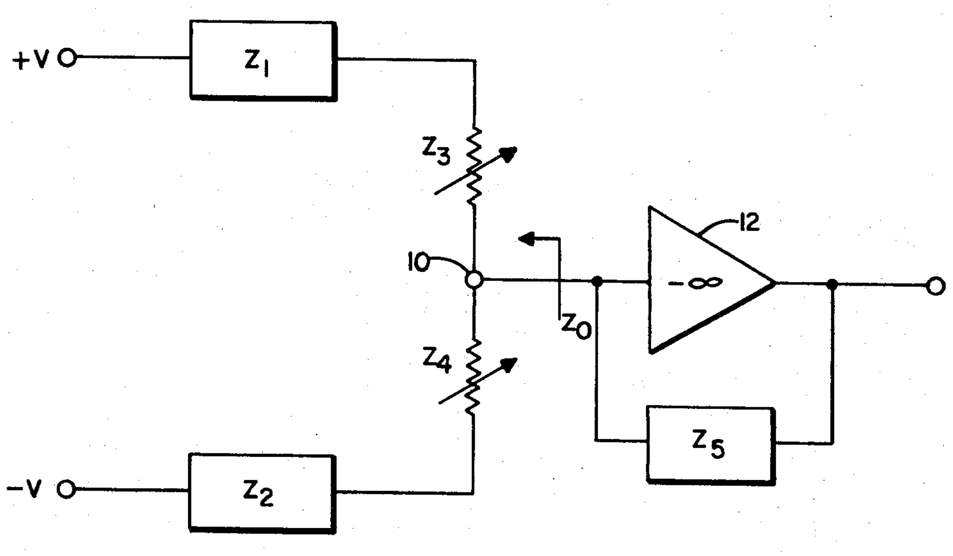
FIG. 1 is a balanceable bridge circuit representing a first species of the invention.
Figure 1:
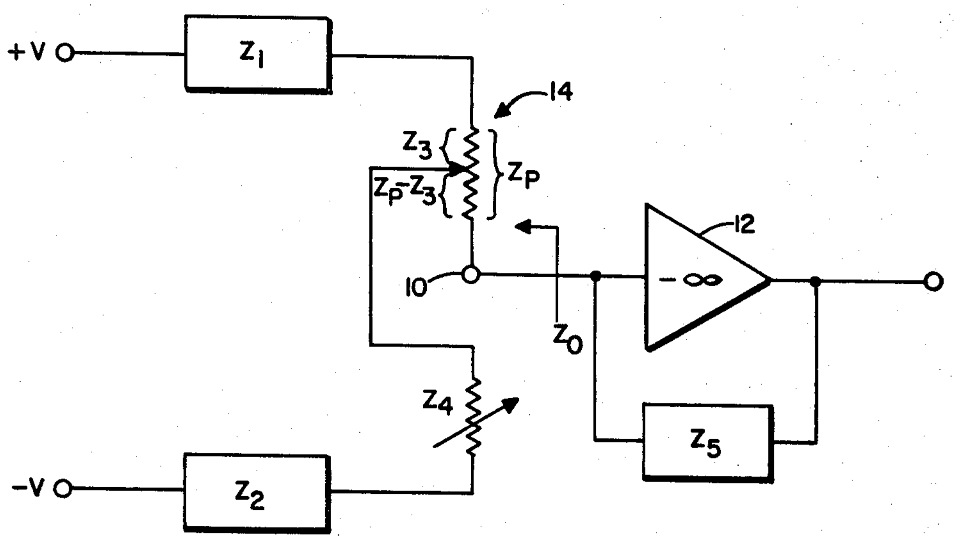

FIG. 1 is a diagram showing one species of the invention. The impedance $Z_3$ is formed by a portion of a potentiometer 14. The resistive element of potentiometer 14 has a total impedance designated $Z_p$. It is connected between summing point 10 and the impedance $Z_1$. Impedance $Z_4$ is connected between the wiper of potentiometer 14 and impedance $Z_2$. The wiper of potentiometer 14 divides the impedance $Z_p$ into two portions, a first portion having an impedance $Z_3$ and a second portion having an impedance $Z_p-Z_3$. The impedance portion $Z_p-Z_3$ is in series with the bridge circuit. Although the impedance $Z_p$ may correspond to a resistive potentiometer in construction, it need not be defined as to the nature of the potentiometrically variable impedance. At bridge balance the circuit of FIG. 1 is defined by the following equations: $Z_1+Z_3=Z_2+Z_4$ $$Z_0=Z_p-Z_3+\frac{Z_1+Z_3}{2}=Z_p+\frac{Z_1-Z_3}{2} \qquad (5)$$

When comparing the expression for $Z_0$ of equation (5) with that of equation (2) three things are apparent. The output impedance $Z_0$ has changed in absolute value; a change in $Z_0$ caused by a change in $Z_3$ in is now in the opposite direction; and, the percentage change in $Z_0$ is smaller.

Figure 2:
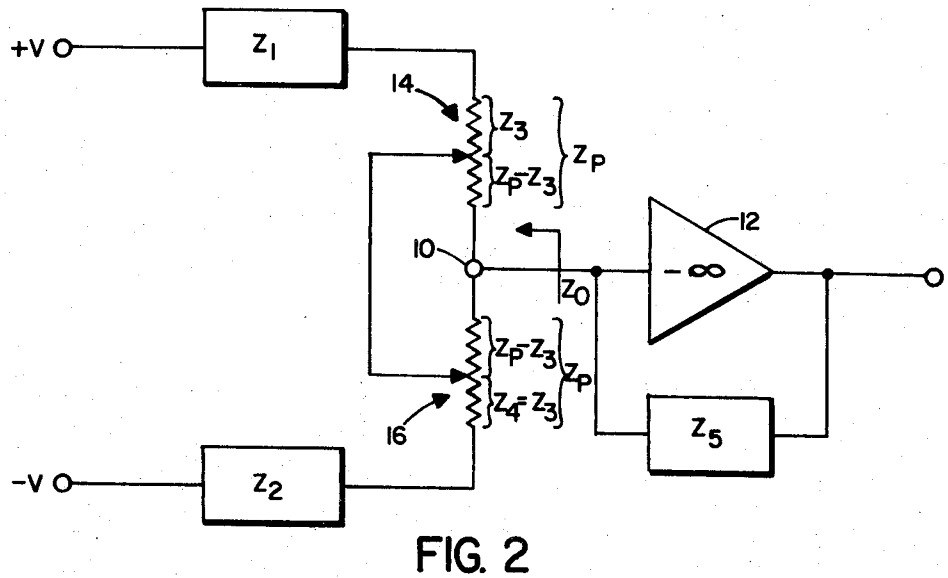
FIG. 2 is a diagram of the invention representing a second species of the invention.

FIG. 2 is another species of the invention which is useful if the variable impedances $Z_3$ and $Z_4$ of FIG. 1 are identical. In FIG. 2 the impedance corresponding to $Z_4$ of FIG. 1 is formed by a portion of a potentiometer 16. The potentiometer 14 of FIG. 1 is carried over into FIG. 2. The resistive portion of potentiometer 16 has a total impedance $Z_p$. The wiper of potentiometer 16 divides the impedance $Z_p$ into two portions, a first portion $Z_4=Z_3$ and a second portion $Z_p-Z_3$. The wipers of potentiometers 14 and 16 are connected together electrically and mechanically. When the bridge is balanced the equations governing the circuit of FIG. 2 are as follows: $Z_1+Z_3 \quad Z_2+Z_3 \therefore Z_1=Z_2$ (6)

$$Z_0=\frac{Z_p+Z_1}{2} \qquad (7)$$

It can be seen therefore that for the circuit of FIG. 2 the gain or sensitivity is not a function of the magnitude of either $Z_3$ or $Z_4$.

Figure 3:
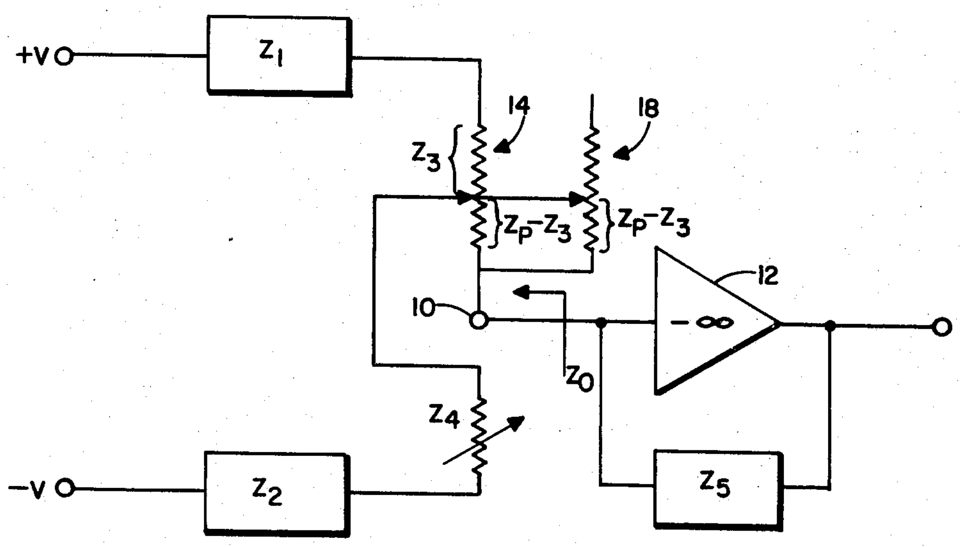
FIG. 3 is a schematic diagram of a bridge circuit representing a third species of the invention.

FIG. 3 is a diagram of another embodiment of the invention. In FIG. 3 the impedance $Z_3$ is formed by a portion of potentiometer 14 which is carried over into FIG. 3 from FIG. 1. Another potentiometer 18 is associated with potentiometer 14. The wiper arms of potentiometers 14 and 18 are ganged together, that is, they are constrained to move together and are electrically connected. The bottom end of the resistive element of potentiometer 18 is connected to the summing point 10 as is the bottom portion of potentiometer 14. The top of the resistive element of potentiometer 18 is floating. The impedance $Z_4$ is connected between the ganged wiper arms of potentiometers 14 and 18 and the impedance $Z_2$. When the circuit of FIG. 3 is balanced the following equations hold: $Z_1+Z_3=Z_2+Z_4$ (8)

$$Z_0=\frac{Z_p+Z_1}{2} \qquad (9)$$

It is seen that $Z_0$ and hence the gain of the system is independent of the position of potentiometers 14 and 18. As shown, this last approach requires the use of a pair of ganged and identical impedances $Z_p$.

Those skilled in the art may come up with other embodiments within the spirit and scope of this invention.

I claim:

1. A balanceable circuit comprising:
a summing junction;
first and second voltage sources; and
first, second, third and fourth impedance units, the third impedance unit comprising a fixed resistive element and a sliding contact, the fourth impedance unit being adjustable, the resistive element of the third impedance unit and the first impedance unit connected in series between the summing junction and the first voltage source, and, the fourth and second impedance units connected in series between the sliding contact of the third impedance unit and the second voltage source.

2. A balanceable circuit comprising:
a summing junction;
first and second voltage sources; and
first, second, third and fourth impedance units, the third and fourth impedance units each comprising a fixed resistive element and a sliding contact, the resistive element of the third impedance unit and the first impedance unit connected in series between the summing junction and the first voltage source, the resistive element of the fourth impedance unit and the second impedance unit connected in series between the summing junction and the second voltage source, and, the sliding contacts of the third and fourth impedance units being electrically and mechanically connected together.